United States Patent
Lamat et al.

(10) Patent No.: US 7,878,454 B2
(45) Date of Patent: Feb. 1, 2011

(54) DOORS OF AIRCRAFT CABINS

(75) Inventors: Patrick Lamat, Lapeyrouse Fossat (FR); Christian Romec, Saint Loup Cammas (FR); Didier Molinari, Toulouse (FR)

(73) Assignee: Latecoere, Toulouse (FR)

( * ) Notice: Subject to any disclaimer, the term of this patent is extended or adjusted under 35 U.S.C. 154(b) by 177 days.

(21) Appl. No.: 11/794,549

(22) PCT Filed: Jan. 6, 2006

(86) PCT No.: PCT/FR2006/000031

§ 371 (c)(1),
(2), (4) Date: Aug. 8, 2007

(87) PCT Pub. No.: WO2006/072749

PCT Pub. Date: Jul. 13, 2006

(65) Prior Publication Data

US 2008/0093504 A1  Apr. 24, 2008

(30) Foreign Application Priority Data

Jan. 7, 2005  (FR) .................................. 05 00157

(51) Int. Cl.
*B64C 1/14* (2006.01)

(52) U.S. Cl. ..................................... 244/129.5; 277/644

(58) Field of Classification Search .............. 244/129.3, 244/129.5, 129.4; 49/460, 462; 277/637, 277/644, 651

See application file for complete search history.

(56) References Cited

U.S. PATENT DOCUMENTS

| | | | | |
|---|---|---|---|---|
| 4,022,948 A | * | 5/1977 | Smith et al. | 428/542.8 |
| 4,580,794 A | * | 4/1986 | Gibbons | 277/650 |
| 5,282,338 A | | 2/1994 | Oliver et al. | |
| 5,303,508 A | | 4/1994 | Porte | |
| 5,615,897 A | | 4/1997 | Akita et al. | |
| 5,897,120 A | * | 4/1999 | Scavo et al. | 277/628 |
| 7,240,905 B1 | * | 7/2007 | Stahl, Sr. | 277/652 |

FOREIGN PATENT DOCUMENTS

| | | |
|---|---|---|
| FR | 2 673 972 | 9/1992 |
| FR | 2 789 144 | 8/2000 |
| FR | 2 794 717 | 12/2000 |
| GB | 602715 | 6/1948 |

* cited by examiner

*Primary Examiner*—Tien Dinh
*Assistant Examiner*—Michael Kreiner
(74) *Attorney, Agent, or Firm*—Young & Thompson

(57) ABSTRACT

The invention relates to a guard for the upper part of a door (2) of an aircraft, consisting of: a composite comprising a composite and/or stainless steel strip (14) which forms the core of the guard (1) and which renders same flexible and resistant, a silicon which is optionally reinforced with fibres and a polyester.

20 Claims, 2 Drawing Sheets

DOORS OF AIRCRAFT CABINS

BACKGROUND OF THE INVENTION

1. Field of the Invention

This invention relates to an improvement to the doors of aircraft cabins.

2. Description of the Related Art

These cabin doors in general have a complex closing/opening movement that combines a vertical shift and a drawing-together movement, which has had the result that a flexible, inserted part, which is called a guard, is frequently located on the outside of the door. This part is shaped so as to come into contact with the cabin of the airplane slightly before the closing of the door and so as to bend elastically during the closing.

While being flexible, this guard should be rigid enough not to separate from the wall of the cabin at high speed, under the effect of aspiration of the boundary layer.

For these various reasons, the guards that are currently used consist of an aluminum strip.

The results that are obtained by these guards that are made of an aluminum strip, however, are not entirely satisfactory.

Actually, these guards exhibit the drawbacks below:

First, it has been proven that at the end of about 5,000 maneuvers of the door, or about 3 years, the guard loses its qualities of elastic resistance and detaches from the cabin during flight.

In addition, these guards are not thick enough to make it possible to house means there that make it possible to detach them easily.

In the French Patent 2,789,144 of Feb. 3, 1999, an elastomer seal, inside which a rigid or elastic reinforcing structure is placed, was described.

Such an arrangement is powerless to provide a solution to the problem that is posed by the sealing of the doors of aircraft cabins.

The seal according to said Patent FR 2,789,144 is designed for a stationary panel that rests on the structure of the aircraft via said seal: such a support is static, whereas the guard according to the invention is designed to be maneuvered thousands of times during which the guard will slide against the structure.

In contrast, the support of the seal of the Patent FR 2,789,144 is linear, whereas it is necessary that the support of the guard of a door be along a surface.

SUMMARY OF THE INVENTION

The object of this invention is a guard that does not have any of these drawbacks.

The guard according to this invention is of the type that comprises a rigid attachment stub, attached to the door of the aircraft and a flexible flap, integral with the stub, characterized by the fact that it consists of a composite that comprises a composite strip and/or a stainless steel strip—a silicone that optionally is reinforced by fibers and polyester.

The invention also comprises the following characteristics:

a) For the guard, the composite strip and/or stainless steel strip comprises a core that is both flexible and resistant and that is immersed in the silicone mass;

b) The attachment stub and the flap are connected to one another by a double-curved connection zone that facilitates the elastic movement of the flap;

c) The outside face of the guard is treated mechanically, so as to allow the placing of a primary coating on which it will be possible to apply paint;

d) The lower face of the guard is covered by a synthetic material that has a good coefficient of friction and anti-icing characteristics;

e) The stub comprises, in cross-section, at least two inserts, immersed in the silicone mass, allowing the fitting of the stub on the door.

BRIEF DESCRIPTION OF THE DRAWING FIGURES

By way of example and to facilitate the comprehension of the invention, in the accompanying drawings.

DETAILED DESCRIPTION

Figure 1:
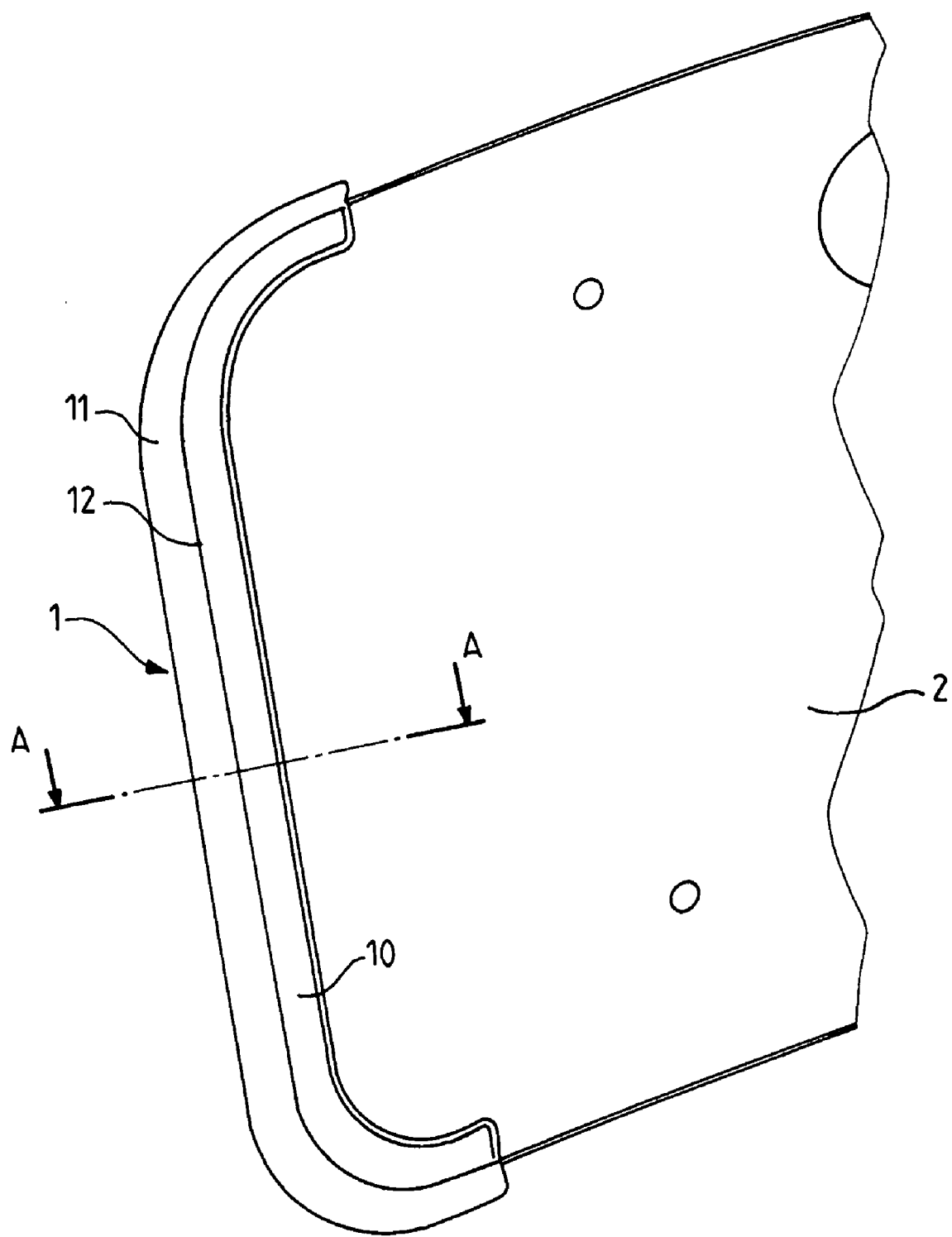
FIG. 1 shows a perspective view of the upper portion of an aircraft door that is equipped with the guard according to the invention.

FIG. 1 shows the upper portion of an aircraft door 2, equipped in its upper portion with a flexible guard, indicated by the general reference 1.

It is seen that this guard 1 is attached not only to the upper flange of the door 2 but projects slightly beyond each side.

Figure 2:
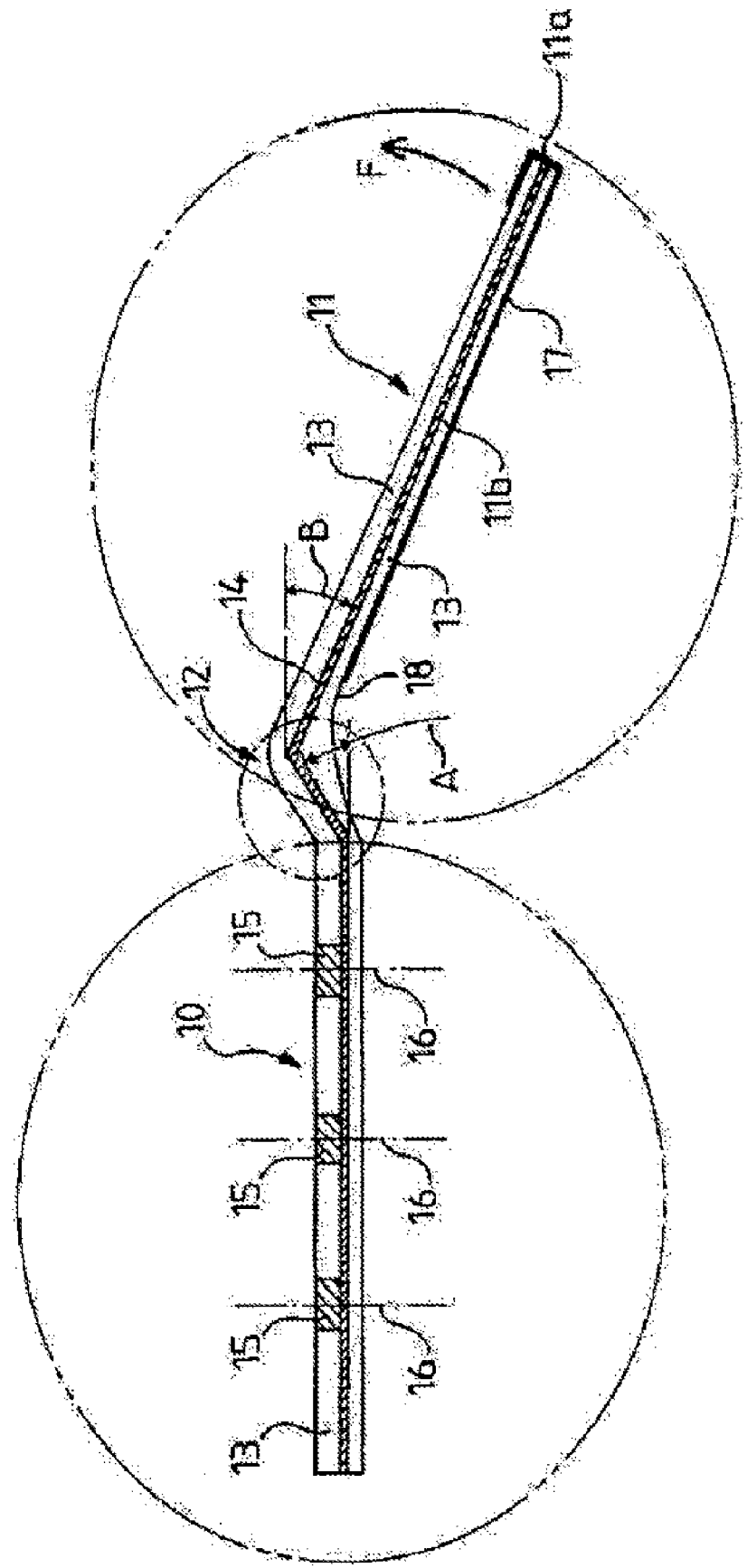
FIG. 2 shows a view of said guard in cross-section along A-A of FIG. 1.

In FIG. 2, it is seen that the guard 1 consists of an attachment stub 10, a flexible flap 11, and a portion 12 that ensures the connection between the stub 10 and the flap 11.

The guard 1 consists of a composite strip and/or a stainless steel sheet strip 14 with a thickness of between 0.15 and 0.75 mm, which is immersed in a mass 13 of flexible material, for example silicone.

So that the guard 1 suitably fulfills its role, it is necessary that:

it be attached in a rigid, but detachable, manner to the door 2 of the aircraft, which is the role of the attachment stub 10;

the portion that comes to rest against the cabin be relatively flexible so as not to rub too strongly against the wall of the cabin, while not deforming too much so as to remain well applied against the cabin during the flight, which is the role of the flap 11;

the two portions 10 and 11 be articulated elastically with one another, which is the role of the connection portion 12.

At least two inserts 15, which rest on the strip 14, are located along the line of section A-A of FIG. 1 in the stub 10. There is thus a plurality of inserts 15 over the entire length of the stub 10.

Thanks to this arrangement, the guard 1 can be attached to the door 2 by means of a screw 16 and is therefore easily detachable, which is not the case with the current guards that are riveted.

The flap 11 is covered at its end 11a and its lower face 11b by a layer 17 that should have both a good coefficient of friction for not scratching the wall of the cabin and anti-icing qualities for not bonding to the wall of the cabin in case of icing-up temperatures.

According to a non-limiting embodiment, the layer 17 can be made of glass fiber material.

The connection portion 12 should allow the flap 11 to move according to arrow F, while exerting a compression spring function keeping said flap 11 at rest against the wall of the cabin.

For this purpose, the strip 14, which constitutes the core of the guard, comprises a double curvature, a first curvature of an angle A upward, followed by a second curvature, so that the strip 14 forms an angle B downward in portion 11. This second curvature forms an angle A+B.

The angle A is preferably on the order of 15° to 20°, and the angle B is on the order of 25° to 30°, such that the second curvature of the strip 14 in the connection portion 12 is on the order of 40° to 50°.

To facilitate the bending of the flap 11 relative to the stub 10, the elastic material mass 13 has, in the connection zone 12, a rounded recess 18.

In its three portions 10, 11 and 12, the upper wall of the silicone mass 13 receives a mechanical surface treatment so as to allow the placing of a primary coating on which it will be possible to apply paint.

This thus treated surface preferably will be covered by a peel-off protective layer during the delivery of the guard.

The invention claimed is:

1. A guard for an upper portion of a door (2) of an aircraft cabin, comprising:
    an attachment part (10) for attachment to an upper flange of the door (2), said attachment part (10) being attached to the door (2) of the aircraft cabin in a rigid, but detachable manner by a means for attachment;
    a flexible flap (11) covered at an end (11a) of the flexible flap (11) by a layer (17) extending to a lower face (11b) of the flexible flap (11);
    a connection portion (12) for connecting said attachment part (10) to said flexible flap (11), said connection portion (12) articulating elastically said flexible flap (11) with said attachment part (10); and
    an elastic strip (14) comprising a core of said guard, said elastic strip (14) extending through the connection portion (12) and comprising a first upward deflection (curvature A) and a second downward deflection (curvature B),
    wherein said flexible flap (11) including the strip (14) is oriented downward and is allowed to move upward, while exerting an elastic contact against the wall of the cabin.

2. The guard according to claim 1, wherein the elastic strip (4) is a composite strip or a stainless steel strip with a thickness of between 0.15 and 0.75 mm.

3. The guard according to claim 1, wherein the guard has three portions:
    the part (10);
    a portion at rest on the cabin of the aircraft or the flap (11); and
    the connection portion (12) between the attachment part (10) and the flap (11).

4. The guard according to claim 3, wherein an upper wall of a silicone mass (13) is treated mechanically so as to allow the placing of a primary coating on which it will be possible to apply paint, and the upper wall is mechanically treated at areas over the attachment part (10), the portion at rest on the cabin of the aircraft or the flap (11) and the connection portion 12.

5. The guard according to claim 3, wherein the attachment part (10) comprises, over an entire length of said attachment part (10), a number of inserts (15) that rest on the strip (14) so as to allow attachment and detachment of the guard by screws (16).

6. The guard according to claim 3, wherein the connection portion (12) between the attachment part (10) and the flap (11) is provided with means for allowing an elastic shift of the flap (11) relative to the attachment part (10).

7. The guard according to claim 3, wherein the flap (11) is covered at the end (11a), and the lower face (11b) is covered by a layer of a material (17) that has a coefficient of friction and anti-icing qualities.

8. The guard according to claim 7, wherein the layer of material (17) is formed from fiber glass.

9. The guard according to claim 1, wherein the curvature A is 15° to 20°, and the curvature B is 25° to 30°.

10. The guard according to claim 1, wherein said elastic strip is embedded in flexible material comprising silicon reinforced by fibers and polyester.

11. A guard for an upper portion of a door (2) of an aircraft, comprising:
    an attachment part (10) for attachment to an upper flange of the door (2), said attachment part (10) being attached to the door (2) of the aircraft cabin in a rigid, but detachable manner by a means for attachment;
    a flexible flap (11) covered at an end (11a) of the flexible flap (11) by a layer (17) extending to a lower face (11b) of the flexible flap (11);
    a connection portion (12) for connecting said attachment part (10) to said flexible flap (11), said connection portion (12) articulating elastically said flexible flap (11) with said attachment part (10); and
    an elastic strip (14) that comprises a composite strip or a stainless steel strip (14), said strip elastic (14) being a core of the guard so as to provide to said guard both flexibility for coming into contact with a cabin of the aircraft and resistance for not separating from a wall of the cabin under an effect of aspiration of a boundary layer, said elastic strip (14) extending through the connection portion (12), said strip (14) being embedded in a mass of flexible material formed from silicon reinforced by fibers and polyester,
    wherein said strip (14) has a curvature A formed by an upward deflection of the connection portion (12) relative to the attachment part (10) and has a curvature A+B formed by a downward deflection of the flexible flap (11) relative to the connection portion (12), and
    said flexible flap (11) including the strip (14) is oriented downward and is allowed to move upward, while exerting an elastic contact against the wall of the cabin.

12. The guard according to claim 11, wherein the composite strip or stainless steel strip has a thickness of between 0.15 and 0.75 mm.

13. The guard according to claim 11, wherein the guard has three portions:
    the attachment part (10);
    a portion at rest on the cabin of the aircraft or the flap (11); and
    the connection portion (12) between the attachment part (10) and the flap (11).

14. The guard according to claim 13, wherein an upper wall of silicone mass (13) is treated mechanically so as to allow the placing of a primary coating on which it will be possible to apply paint, and the upper wall is mechanically treated at areas over the attachment part (10), the portion at rest on the cabin of the aircraft or the flap (11) and the connection portion 12.

15. The guard according to claim 13, wherein the attachment part (10) comprises, over an entire length of said attachment part (10), a number of inserts (15) that rest on the strip (14) so as to allow attachment and detachment of the guard by screws (16).

16. The guard according to claim 13, wherein the connection portion (12) between the attachment part (10) and the flap

(11) is provided with means for allowing an elastic shift of the flap (11) relative to the stub (10).

17. The guard according to claim 13, wherein the flap (11) is covered at the end (11a), and the lower face (11b) is covered by a layer of a material (17) that has a coefficient of friction and anti-icing qualities.

18. The guard according to claim 17, wherein the layer of material (17) is formed from fiber glass.

19. The guard according to claim 11, wherein the angle A is 15° to 20°, and the angle B is 25° to 30°.

20. A guard for an upper portion of a door (2) of an aircraft, comprising:

an attachment part (10) for attachment to an upper flange of the door (2), said attachment part (10) being attached to the door (2) of the aircraft cabin in a rigid, but detachable manner by a means for attachment;

a flexible flap (11) covered at an end (11a) of the flexible flap (11) by a layer (17) extending to a lower face (11b) of the flexible flap (11);

a connection portion (12) for connecting said attachment part (10) to said flexible flap (11), said connection portion (12) articulating elastically said flexible flap (11) with said attachment part (10); and a composite that comprises a composite strip or a stainless steel elastic strip (14), whereby said elastic strip (14) constitutes a core of the guard so as to provide to said guard both flexibility for coming into contact with a cabin of the aircraft and resistance for not separating from a wall of the cabin under an effect of aspiration of a boundary layer, said strip (14) being embedded in a mass of flexible material, wherein said strip (14) has a curvature A formed by an upward deflection of a connection portion relative to that attachment part (10) and has a curvature A+B formed by a downward deflection of a flap relative to a connection portion, said flexible flap (11) including the strip (14) is oriented downward and is allowed to move upward, while exerting an elastic contact against the wall of the cabin, and wherein the guard comprises three portions:

the attachment part (10);

a portion at rest on the cabin of the aircraft or the flap (11); and the connection portion (12) between the attachment part (10) and the flap (11).

* * * * *